Oct. 17, 1939.  G. D. STOUGH  2,176,367
CLOSURE
Filed Sept. 16, 1936  5 Sheets-Sheet 1

INVENTOR
Gerald D. Stough.
BY
Harness, Dickey, Pierce & Hann
ATTORNEYS.

Oct. 17, 1939.  G. D. STOUGH  2,176,367
CLOSURE
Filed Sept. 16, 1936   5 Sheets-Sheet 2
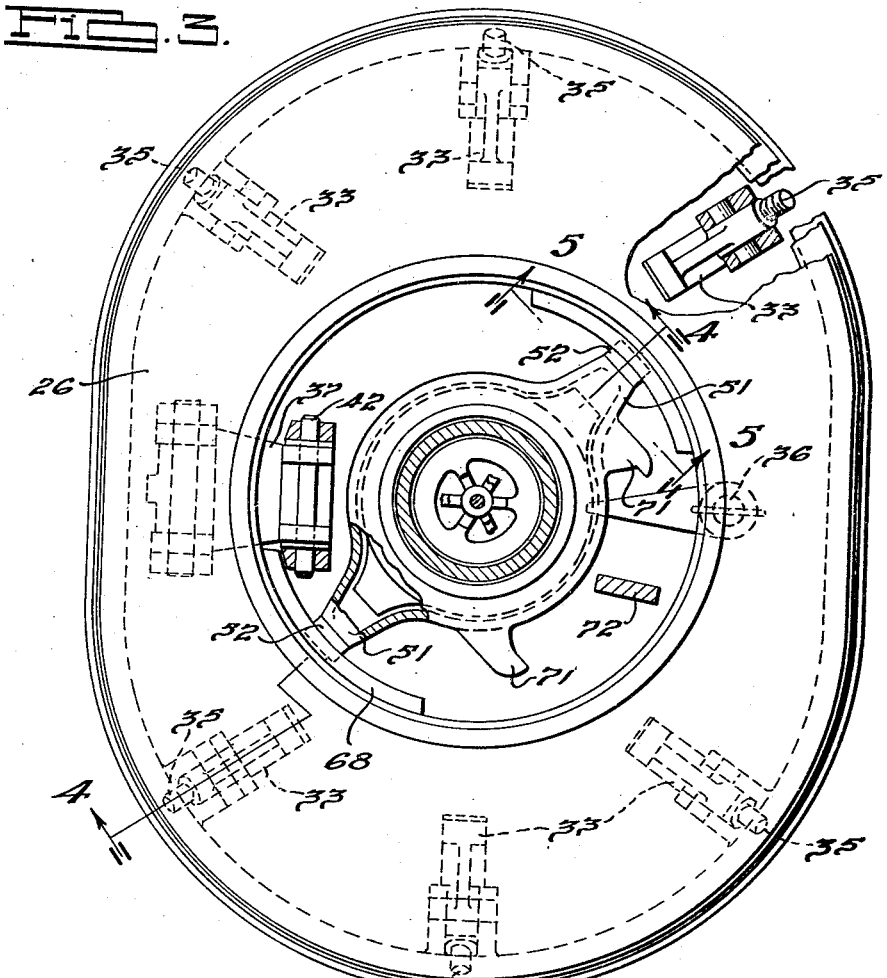
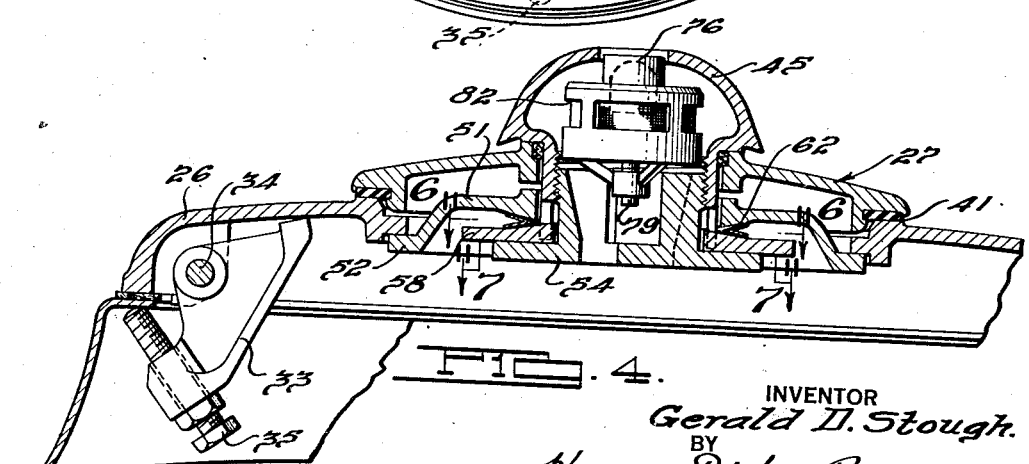
INVENTOR
Gerald D. Stough.
BY
Harness, Dickey, Pierce & Hann.
ATTORNEYS.

Oct. 17, 1939.   G. D. STOUGH   2,176,367
CLOSURE
Filed Sept. 16, 1936   5 Sheets-Sheet 3
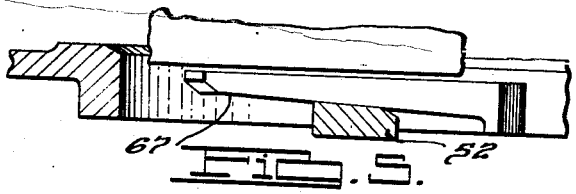
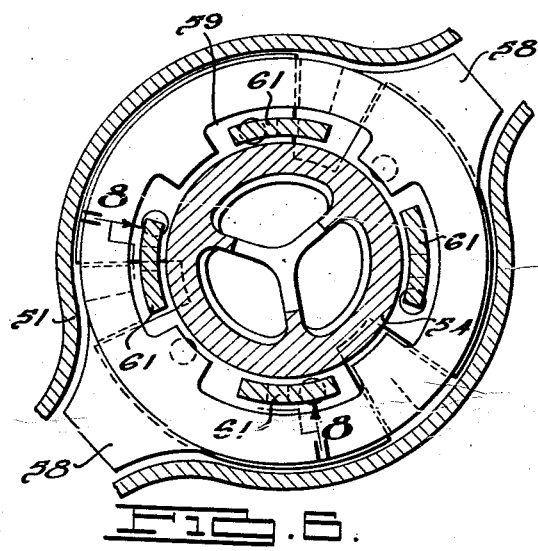
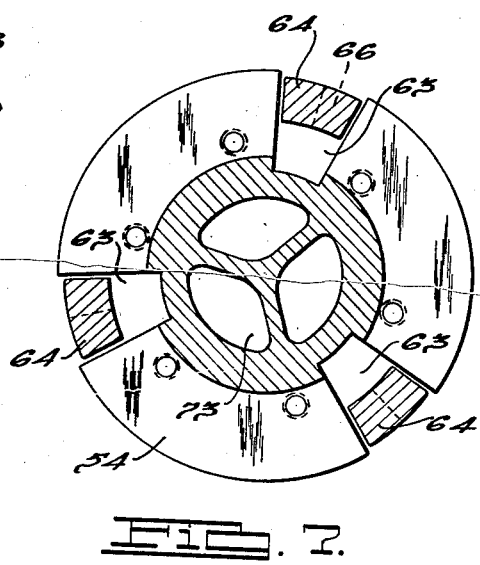
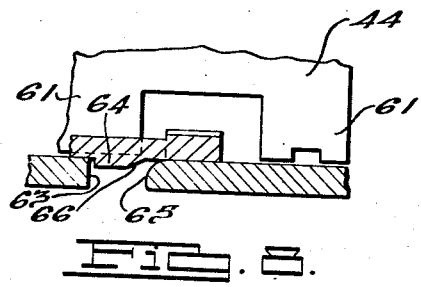
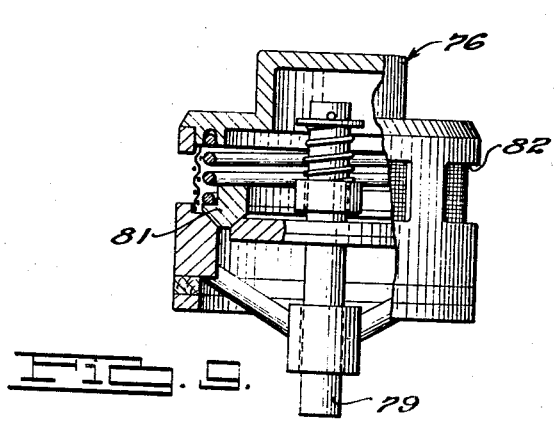
INVENTOR
Gerald D. Stough.
BY
Harness, Dickey, Pierce & Hans
ATTORNEYS.

Oct. 17, 1939.    G. D. STOUGH    2,176,367
CLOSURE
Filed Sept. 16, 1936    5 Sheets-Sheet 4

INVENTOR
Gerald D. Stough.
BY
Harness, Dickey, Pierce & Han
ATTORNEYS.

Oct. 17, 1939.  G. D. STOUGH  2,176,367
CLOSURE
Filed Sept. 16, 1936  5 Sheets-Sheet 5
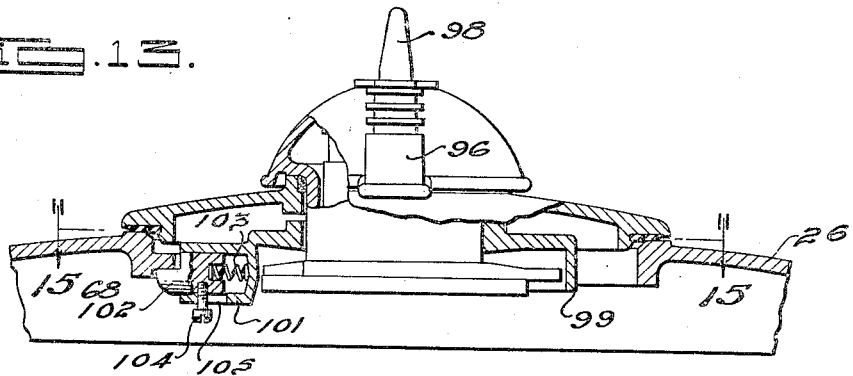
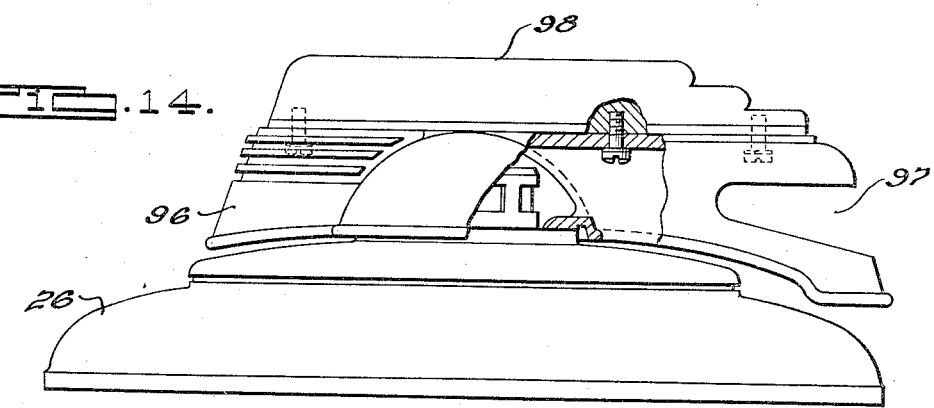
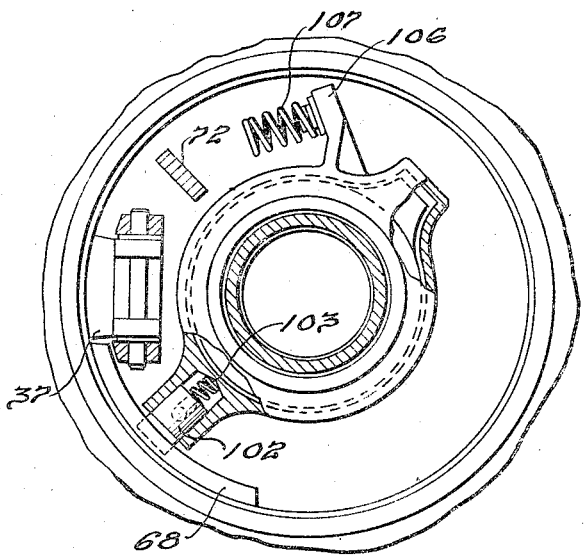
INVENTOR
Gerald D. Stough.
BY
Harness, Dickey, Pierce & Hann.
ATTORNEYS.

Patented Oct. 17, 1939

2,176,367

UNITED STATES PATENT OFFICE 2,176,367

CLOSURE

Gerald D. Stough, Highland Park, Mich., assignor to Gar Wood Industries, Inc., a corporation of Michigan Application September 16, 1936, Serial No. 100,999

6 Claims. (Cl. 220—55)

My invention relates to covers for tanks and particularly to a cover for a tank having a hinged closure element thereon known in the tank car art as a "fill plug."

Tank cars such as employed on automotive vehicles and trailers may be made of one or more compartments for carrying various types of oils and products thereof. Each of the compartments is provided with an opening in the top in which a "fill plug" is mounted. The "fill plug" is an element which may be opened and readily sealed to the top of the tank compartment and is employed to permit the admission of a fluid thereinto.

In practicing the present invention, I employ a cover element for an opening in the tank compartment which is readily applied and sealed to the marginal edge thereof. The cover contains a large opening over which the "fill plug" extends and with which it has sealing engagement. A boss having a transversely extending handle projects through the "fill plug" and supports and operates locking arms for drawing the "fill plug" into sealed relation with the cover. The boss is hollow and provided with venting means for maintaining the internal pressure of the tank at atmosphere.

A hinge is provided between the cover and the "fill plug" which is disposed toward the front end of the truck or trailer for the purpose of causing the fill plug to be moved to closed position by gravity when the truck is initially operated. Novelty may also be provided by having the latching portion of the fill plug so arranged as to automatically lock the fill plug on the cover. This feature is an important advancement in the art and provides assurance that the cover is closed and latched when the vehicle is put in motion in case that the operator neglects to close and latch the "fill plug."

Accordingly, the main objects of my invention are; to provide a "fill plug" and cover for a tank car which is readily attachable thereto; to provide a cover for an opening in a tank compartment which is readily secured thereto and which has a "fill plug" mounted thereon; to provide a "fill plug" for an opening in an element which is readily sealed and clamped thereto; to provide a hinged "fill plug" for a vehicle tank compartment which has the hinge disposed toward the front end of the vehicle to have the "plug" jarred to closed position when the vehicle is initially moved; to provide a "fill plug" for a vehicle which moves to closed position and automatically latches when the vehicle is initially moved; to provide a "fill plug" for a tank compartment which has an operating handle disposed transversely of a boss extending through the center of the "fill plug"; to provide means in the hollow interior of the boss for maintaining the internal pressure of the tank constant; and in general, to provide a "fill plug" for a compartment of a vehicle which is completely sealed when locked, which automatically latches itself in closed position when the vehicle is moved, which is simple in construction and economical of manufacture.

Other objects and features of novelty of my invention will be either specifically pointed out or will become apparent when referring for a better understanding of my invention, to the following description taken in conjunction with the accompanying drawings, wherein:

Fig. 3 is a sectional view of the structure illustrated in Fig. 2, taken on the line 3—3 thereof, with parts broken away;

Fig. 4 is a sectional view of the structure illustrated in Fig. 3, taken on the line 4—4 thereof;

Fig. 5 is an enlarged broken sectional view of the structure as illustrated in Fig. 3, taken on the line 5—5 thereof;

Fig. 6 is an enlarged sectional view of the structure illustrated in Fig. 4, taken on the line 6—6 thereof;

Fig. 7 is an enlarged sectional view of the structure illustrated in Fig. 4, taken on the line 7—7 thereof;

Fig. 8 is a broken sectional view of the structure illustrated in Fig. 6 taken on the line 8—8 thereof;

Fig. 9 is an enlarged view of the venting element illustrated in Figs. 2 and 4, with parts in section;

Fig. 13 is a view, partly in section, partly in elevation, of a "fill plug", similar to that illustrated in Fig. 4, showing a modified form thereof;

Fig. 14 is a view in side elevation with parts broken away, of the structure illustrated in Fig. 13; and Fig. 15 is an enlarged sectional view of the structure illustrated in Fig. 13, taken on the line 15—15 thereof.

Figure 1:
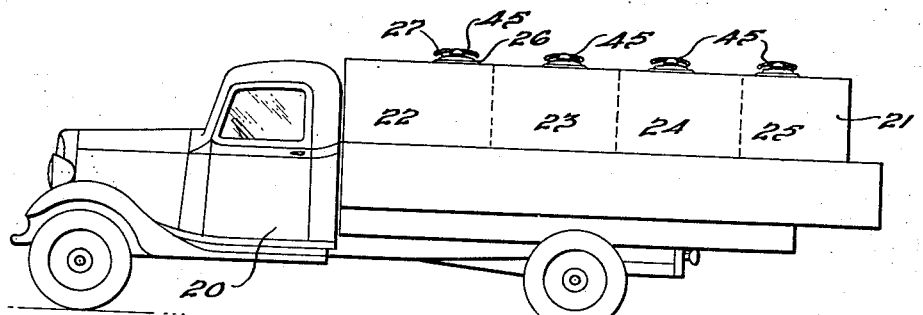
Figure 1 is a side elevational view of a tank vehicle embodying features of my invention.

Referring to Fig. 1, I have illustrated an automotive truck 20 carrying on its chassis a fuel tank 21. The tank 21 is internally divided into a plurality of compartments 22, 23, 24, and 25. At the top of each of the compartments an opening is provided which is closed by a cover 26 containing a "fill plug" 27.

Figure 2:
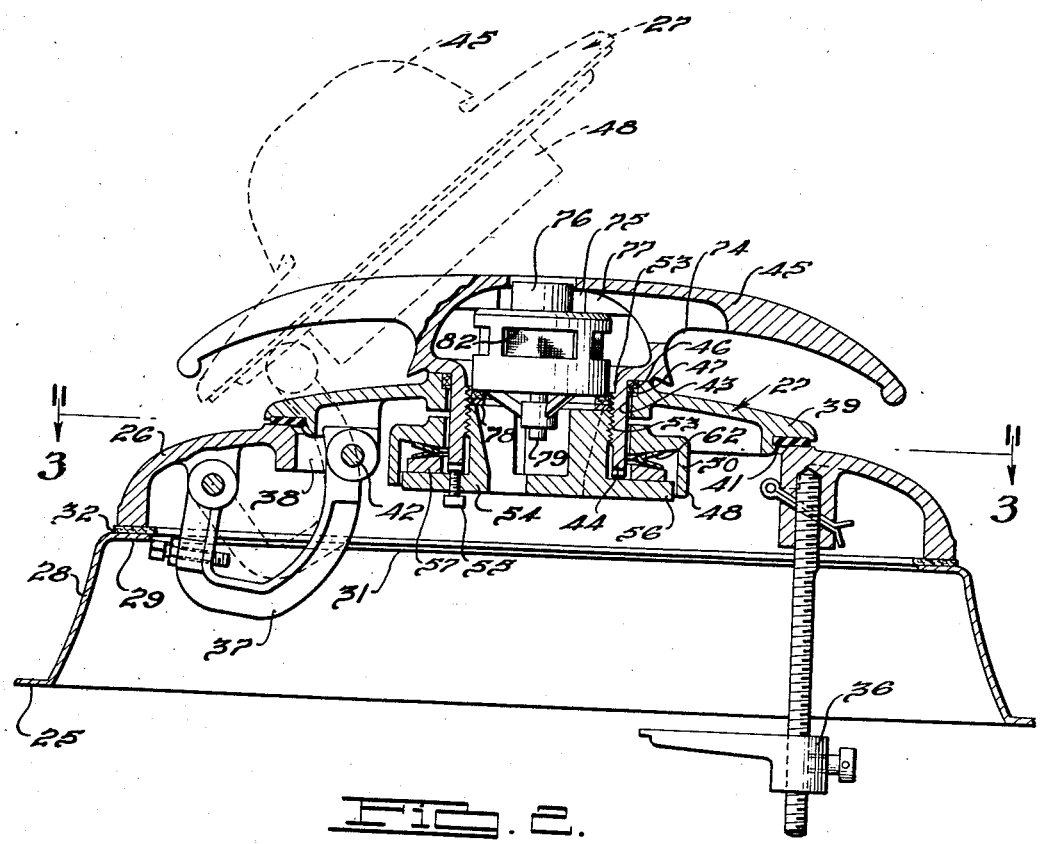
Fig. 2 is an enlarged longitudinal sectional view of a "fill plug" and cover assembly as employed on the tank car illustrated in Fig. 1.

Referring more particularly to Figs. 2, 3, and 4, I have illustrated the tank compartment 25 as having the metal at the top thereof extended at 28 and flanged inwardly at 29 forming an opening 31. The flange 29 provides a ledge to which the cover 26 is sealed. The opening is preferably elongated transversely of the vehicle as illustrated in Fig. 3, as is also the cover 26 which is sealed thereto. A gasket 32 is provided between the cover and the flange 29 drawn together by a plurality of clamping fingers 33 which are pivotally mounted on the cover 26 on pins 34. Screws 35, carried by the fingers 33, are drawn against the under surface of the flange 29 to securely clamp the cover in place. In this manner, the cover is readily firmly attached to the tank.

As illustrated in Fig. 2, an adjustable level indicator 36 is illustrated as being supported by the cover 26 for the purpose of indicating the exact capacity of the tank compartment. The cover also carries a U-shaped hinge 37 which is disposed on the center line of the vehicle toward its front end. When disposed in this position, the initial forward movement of the vehicle will cause the "fill plug" to be closed by gravity on to the cover.

The cover 26 is provided with an opening 38 which is closed by the "fill plug" 27. The "fill plug" embodies a shouldered cap 39 carrying on the shoulder thereof, a gasket 41 which engages the top marginal edge about the opening in the cover 26. The hinge 37 is pivoted by a pin 42 to the cap 39. The cap 39 is provided with a central opening 43, through which a hollow boss 44 on an operating casting 45 extends. The casting 45 has a central semi-spherical portion from which ears project, forming the handles by which the casting is manually rotated. A sealing element 46 is provided about the boss 44 in engagement with a shoulder 47 in the cap 39. About the exterior of the boss 44 a locking element 48 is provided having oppositely disposed extending portions 51 carrying clamping fingers 52 on their ends. The interior wall of the boss 44 is provided with a thread 53 in which a plug 54 is screwed and locked relative thereto by a plurality of screws 55. A flange 56 is provided on the plug 54 which is disposed within the shoulder 50 on the locking element 48. Above the flange 56, an annular plate 57 is positioned having circumferentially spaced projections 58 which extend within the hollow extensions 51 of the locking element 48. Slots 59 are provided in the plate 57 through which projecting ends 61 of the boss 44 extend to be engaged by the ends of the screws 55. A pair of dish-shaped spring washers 62 are mounted between the plate 57 and the locking element 48. The flange 56 of the plug 54 is provided with a plurality of slots 63 in which projecting fingers 64 on the under side of the plate 58 project. The slot is illustrated in Fig. 8 as being provided with an arcuate edge 65, while the projecting finger 64 is provided with a sloping surface 66. A final movement between the flange 56 and the plate 57 provides a final locking movement which draws the cap into positive sealed relation with the cover. The fingers 52 of the projecting portions 51 on the locking element 48 engage sloping surfaces 67 provided on a projecting flange 68 which extends inwardly of the opening 43 in the cap 39.

Initial movement of the handle 45 produces the turning of the boss 44 and plug 54, as well as the plate 57, and through the frictional engagement of the spring 62, causes also the turning movement of the locking element 48. This movement causes the extending portions 52 of the element 48 to move under the projection 68 until the friction between the sloping surface 67 thereof and the fingers 52 prevent further movement of the element. Thereafter, the continued movement of the handle 45 causes the boss 44 to rotate relative to the plate 57 which is retained against movement by the projecting end portions 58, which project within the extending portions 51 of the locking element 48. The flange 56 which rotates with the boss 44 carries the projections 64 into engagement with the plate 57 to thereby place a further locking tension on the spring 62 which draws the cap 39 against the cover. In the reverse operation of the handle, the initial movement immediately causes the disengagement of the projection 64 from the plate 57 after which the fingers 52 are moved out of engagement with the projections 68 and the "fill plug" may then be opened. Lugs 71 project from the sides of the locking element 48 disposed on either side of a projection 72 extending from the under side of the cap 39. The projection 72 limits the arcuate movement of the clamping element 48 and thereby positions the fingers 52 relative to the projections 68.

The plug 54 is provided with a plurality of vent openings 73 as illustrated in Fig. 7. Vent openings 74 are also provided in the handle 45, in communication with the central interior portion 75 which is hollow. Within the hollow portion 75 a vent valve 76 is mounted, retained in position against a plurality of projecting fins 77 by the plug 54 which is clamped against a plurality of sealing washers 78. The vent valve is illustrated in Fig. 9 as being provided with a tappet 79 which is spring pressed against a seat on a second spring pressed tappet 81. Suitable screened vents 82 are provided in the wall of the valve. When the internal pressure of the tank reaches a predetermined amount both of the tappets are raised to permit the venting of the gases through the vents 82. When the pressure on the interior of the tank becomes less than atmosphere, the tappet 79 is operated to admit air into the tank. In this manner, a complete seal is provided for the tank which functions to permit the ingress and egress of gases, depending upon the change of pressure within and without the tank.

Figure 10:
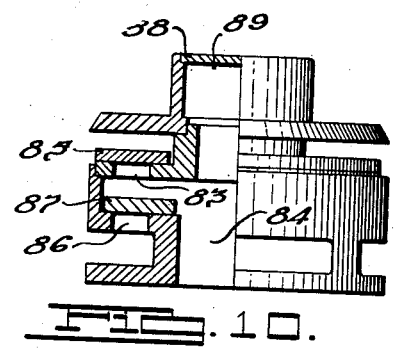
Fig. 10 is a view of a vent assembly similar to that illustrated in Fig. 9, showing a modified form thereof.

In Fig. 10, a vent valve is illustrated which is employed in the same manner, but which is of different construction. In this construction an orifice 83 is connected to the interior of the tank through a central passage 84 and when the pressure on the interior of the tank is greater than atmosphere, a washer 85 is raised to permit the gases to pass to atmosphere. The washer 85 is preferably heavy, made of bronze or similar material, to provide an effective seal. The exterior of the tank is connected to the interior passage 84 through an orifice 86. This orifice is closed by a washer-like valve 87 which is preferably light and made of such material as aluminum. When the pressure on the interior of the tank drops below atmosphere, air will enter through the passage 86 into the interior of the tank. Further novelty is provided in this type of valve in providing a washer 88 for a passage 89 in aligned extension of the passage 84. The washer 88 is made of a material which readily melts when subjected to heat, such as that commonly known in the art as Wolf's metal. In case of fire, the washer 88 will immediately melt and the interior gases, the pressure of which have increased in view of the heat, will be immediately vented.

Figure 11:
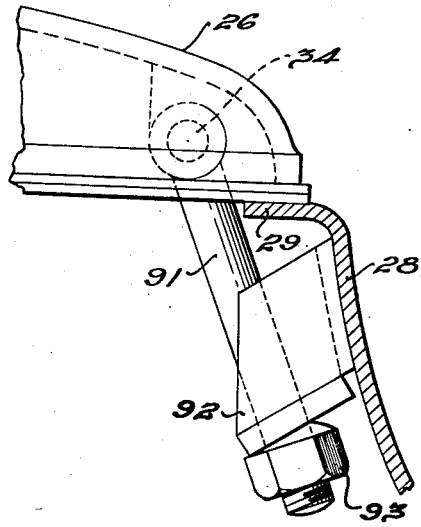
Fig. 11 is a view of clamping means for the cover, similar to that illustrated in Figs. 3 and 4, showing a modified form thereof.
Figure 12:
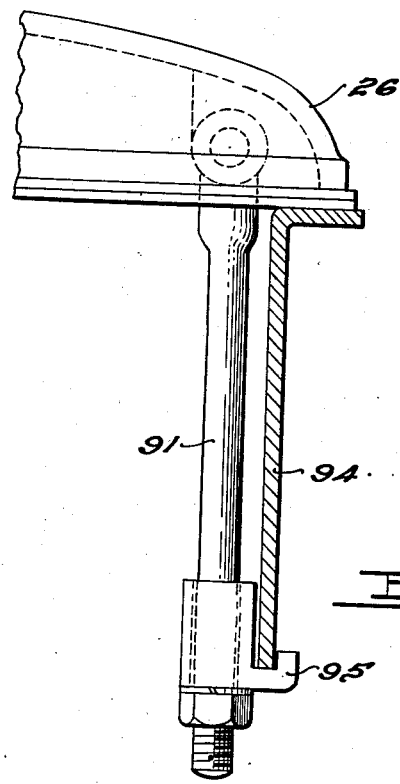
Fig. 12 is a view of clamping means for the cover, similar to that illustrated in Figs. 3, 4, and 11, showing a further form which the clamping means may assume.

In Fig. 11, I have illustrated a further form of clamping means for the cover 26 which embodies the use of eye bolts 91 which are pivoted to the cover on the pivots 34 and which are moved into engagement with bifurcated projections 92 secured to the interior surface of the tank wall. Suitable nuts 93 draw the cover 26 against the flange 29 of the tank compartment and lock the cover in position. In Fig. 12, I have shown the use of similar eye bolts employed when an annular flange 94 is provided about the marginal edge of the opening in the tank. A hook clamp 95 is carried by the eye bolt 91 and engages the bottom edge of the flange 94 when the nut is tightened and the cover is drawn firmly into engagement with the gasket and supporting flange.

Referring to Figs. 13, 14, and 15, I have shown a further novel form which my "fill plug" may assume. In this construction, a streamlined type of handle 96 is cast integral with the boss 44. A slot 97 is provided in the trailing end of the handle to permit the insertion of the fingers so as to raise the "fill plug." A medallion 98 may be secured to the top of the handle and may bear the trade name or mark of the owner of the tank vehicle. This medallion may also be streamlined and follow the shape of the handle portion 96.

A clamping element 99 is of different construction from the clamping element 48, heretofore described and illustrated. In this construction, in place of the extending portion 51, a cylindrical extension 101 is provided. An axially movable locking bolt 102 is contained within the cylinder against the pressure of a spring 103. A screw 104 operating in a slot 105 limits the movement of the bolt. A further change is provided in the use of an extending lug 106 on the side of the locking element 99 which has a spring 107 secured thereto. The spring engages the extension 72 on the cap 39 and the operation in opening the "fill plug" is the same as that of the structure described heretofore. However, after the plug is opened and disposed in raised position, which position is adjusted by means of a screw 108, the release of the handle will release the energy stored in the spring 107 due to its engagement with the stop 72 and causes the handle to be revolved into a position sufficient to permit the locking bolt 102 to engage the projection 68 provided on the cover. If the vehicle is moved when the plug is opened, due to the accurate adjustment of the position of the "fill plug" by the screw 108, the "fill plug" will move by gravity to closed position and since the lock bolt 107 has been rotated to be in the path of the projection 68, the "fill plug" will automatically lock. With this construction, the hazards of driving with the "fill plug" in open position, as often occurs, is entirely eliminated.

It is claimed that:

1. A closure for an opening in a housing including, in combination, a cover having an opening therethrough, securing means on the cover adapted to engage said housing to retain said cover in sealed relation thereto, a cap adapted to close the opening in said cover and hinged thereto, said cap having a central opening, said cover having cam surfaces, and operating means extending through the opening in said cap adapted to engage said cam surfaces for drawing said cap into sealing engagement with said cover, and additional cam surfaces carried by said operating means for applying further clamping pressure after said first clamping means have been secured.

2. A cap for closing an opening in a cover employed with a tank of a vehicle, a hinge interconnecting the cap and cover and positioned toward the front of the vehicle, latch means for securing said cap to said cover, a cam surface carried by said cover, a spring pressed bolt carried by said latch mechanism, and spring means for turning said operating means to have the bolt intercept the cam surface when the cap is moved to closed position.

3. In combination with a vehicle having a tank associated therewith, said tank having an opening, a cover for said opening, a hinge for supporting said cover, rotatable latching means for securing said cap in latched position, and means for rotating said latching means after it has been released to cause it to rotate into a position in which it will latch when closed.

4. A cap for enclosing an opening in a tank, a fixed cam surface adjacent to said opening, latching means carried by said cap, said latching means embodying a spring pressed bolt, means for operating said latching relative to said cam surface for sealing said cap at the marginal edge of said opening, and means for turning said latching means after it has been rotated past said cam surface to permit the cap to be moved to open position for returning said latching means into a position of engagement with said cam surface.

5. A cap for sealing an opening provided with a central aperture, an operating element extending through said aperture and sealed to the marginal edge thereof, a latching element journaled on said operating element and having cam surfaces on its ends, a plate fixed relative to said latching element, spring discs interposed between said plate and said latching element, and a flanged extension on said operating element rigidly secured thereto having a cam surface matable with a surface on said plate whereby the actuation of the operating element will cause the latching element to move to clamp said cap and after which further movement of the operating mechanism will cause a pressure to be applied between the cap and latching element to lock it into position by the actuation of the cam surfaces on the flange and plate.

6. A cap for a cover of a closure element having means for securing said cap in sealed relation to said cover, including, in combination, two sets of cams supported on the underside of said cover, an operating element projecting from the top of said cap, connections between one set of cams and said element for effecting a latching engagement upon the initial movement of said element, and connections between said element and said second set of cams to cause said second set of cams to be operated to provide a sealing force between the cap and cover during the final movement of said element.

GERALD D. STOUGH.